United States Patent
Lepak et al.

(10) Patent No.: US 7,640,399 B1
(45) Date of Patent: Dec. 29, 2009

(54) MOSTLY EXCLUSIVE SHARED CACHE MANAGEMENT POLICIES

(75) Inventors: Kevin M. Lepak, Austin, TX (US); Roger D. Isaac, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 207 days.

(21) Appl. No.: 11/432,707

(22) Filed: May 10, 2006

(51) Int. Cl.
*G06F 12/12* (2006.01)
*G06F 13/00* (2006.01)

(52) U.S. Cl. .................. 711/136; 711/130; 711/144; 711/145

(58) Field of Classification Search ............... None
See application file for complete search history.

(56) References Cited

U.S. PATENT DOCUMENTS

| | | | |
|---|---|---|---|
| 4,181,937 A * | 1/1980 | Hattori et al. | ............... 711/133 |
| 5,717,895 A | 2/1998 | Leedom et al. | |
| 5,835,950 A | 11/1998 | Cho et al. | |
| 5,924,118 A | 7/1999 | Arimilli et al. | |
| 5,946,705 A | 8/1999 | Cumming et al. | |
| 5,987,585 A | 11/1999 | Motoyama et al. | |
| 6,052,760 A * | 4/2000 | Bauman et al. | ............. 711/119 |
| 6,119,205 A | 9/2000 | Wicki et al. | |
| 6,161,166 A | 12/2000 | Doing et al. | |
| 6,175,906 B1 | 1/2001 | Christie | |
| 6,662,173 B1 | 12/2003 | Hammarlund et al. | |
| 6,725,337 B1 | 4/2004 | Tan et al. | |
| 7,318,127 B2 | 1/2008 | Hrusecky et al. | |
| 2006/0143390 A1 * | 6/2006 | Kottapalli | ................... 711/130 |

OTHER PUBLICATIONS

"The effect of using state-based priority information in a shared-memory multiprocessor cache replacement policy". Mounes-Toussi and Lilja. Proceedings: 1998 International Conference on Parallel Processing. Aug. 10-14, 1998.*

* cited by examiner

*Primary Examiner*—Reginald G Bragdon
*Assistant Examiner*—Eric Loonan
(74) *Attorney, Agent, or Firm*—Rory D. Rankin; Meyertons Hood Kivlin Kowert & Goetzel, P.C.

(57) ABSTRACT

A system and method for managing a memory system. A system includes a plurality of processing entities and a cache which is shared by the processing entities. Responsive to a replacement event, circuitry may identify data entries of the shared cache which are candidates for replacement. Data entries which have been identified as candidates for replacement may be removed as candidates for replacement in response to detecting the data entry corresponds to data which is shared by at least two of the plurality of processing entities. The circuitry may maintain an indication as to which of the processing entities caused an initial allocation of data into the shared cache. When the circuitry detects that a particular data item is accessed by a processing entity other than a processing entity which caused an allocation of the given data item, the data item may be deemed classified as shared data.

13 Claims, 7 Drawing Sheets

MOSTLY EXCLUSIVE SHARED CACHE MANAGEMENT POLICIES

BACKGROUND OF THE INVENTION

1. Field of the Invention

This invention is related to computer systems and, more particularly, to memory management within computer systems.

2. Description of the Related Art

Typically, computer systems include one or more caches to reduce the latency of a processor's access to memory. Generally, a cache may store one or more blocks, each of which is a copy of data stored at a corresponding address in the memory system of the computer system. In cases where a system includes multiple processors, or processing cores, some caches may be exclusive to particular processors, while others are shared. Various benefits of shared levels of cache for multi-core processors and multi-threaded workloads are well-understood. However, for multi-programmed workloads, shared levels of cache can leave significant opportunity for optimization. Multiple programs (e.g., one running on each core) can interact micro-architecturally, although they have no real "relation" to one-another. Each of the programs may have very different requirements on execution resources, memory resources, etc. Consequently, the behavior of one program with respect to a shared cache may negatively impact the operation of another program.

Exclusive cache hierarchies are sometimes used to maximize the utility of cache space on a die and prevent off-chip cache misses. Exclusive cache hierarchies generally refers to those cache systems in which different levels of a cache hierarchy do not contain duplicate information. In contrast to exclusive cache hierarchies, inclusive cache hierarchies may contain multiple copies of a sane cache line. While exclusive cache hierarchies may have various benefits in single-core processor chips, in multi-core chips strict exclusivity may be an impediment to achieving optimal performance on multi-threaded workloads since such workloads exhibit multiple cores accessing shared cache lines.

In view of the above, methods and mechanisms are desired for determining when "exclusive" management versus "shared" management for a given cache line is preferred to improve shared cache replacement decisions.

SUMMARY OF THE INVENTION

Systems and methods for managing a memory system are contemplated.

A system is contemplated which includes a plurality of processing entities and a cache which is shared by the plurality of processing entities. Circuitry is included which is configured to manage a replacement policy of said shared cache. Responsive to a replacement event, the circuitry is configured to identify data entries of the shared cache which are candidates for replacement. Data entries which have been identified as candidates for replacement may be removed as candidates for replacement in response to detecting the data entry corresponds to data which is shared by two or more of the plurality of processing entities.

In one embodiment, the circuitry is configured to maintain an indication as to which processing entity of the plurality of processing entities caused an initial allocation of data into the shared cache. When the circuitry detects that a particular data item is accessed by a processing entity other than a processing entity which caused an allocation of the given data item, the data item may be deemed classified as shared data. In addition, replacement information may be maintained for each entry of the shared cache and updated to indicate the corresponding data is most recently used (MRU) upon allocation of corresponding data in the shared cache. Data entries may then be progressively aged by updating the replacement information. In one embodiment, entries may age from an MRU status to a least recently used (LRU) status.

Also contemplated is a system wherein the circuitry is configured to identify a data entry as a candidate for replacement, in response to detecting a status of said data entry is LRU, and modify a status of the data entry to indicate MRU, in response to detecting said data entry is shared by two or more of the plurality of processing entities. In various embodiments the circuitry is further configured to set a sticky indication that a data item within the shared cache is shared by two or more of the plurality of processing entities, and maintain the sticky indication when the data item is removed from the shared cache, or accessed by another processing entity. When a data item is allocated in the shared cache, the circuitry may automatically classify the allocated data as shared data in response to detecting the sticky indication is set.

These and other embodiments are contemplated and will be appreciated upon reference to the following description and figures.

BRIEF DESCRIPTION OF THE DRAWINGS

Other objects and advantages of the invention will become apparent upon reading the following detailed description and upon reference to the accompanying drawings in which.

Figure 1:
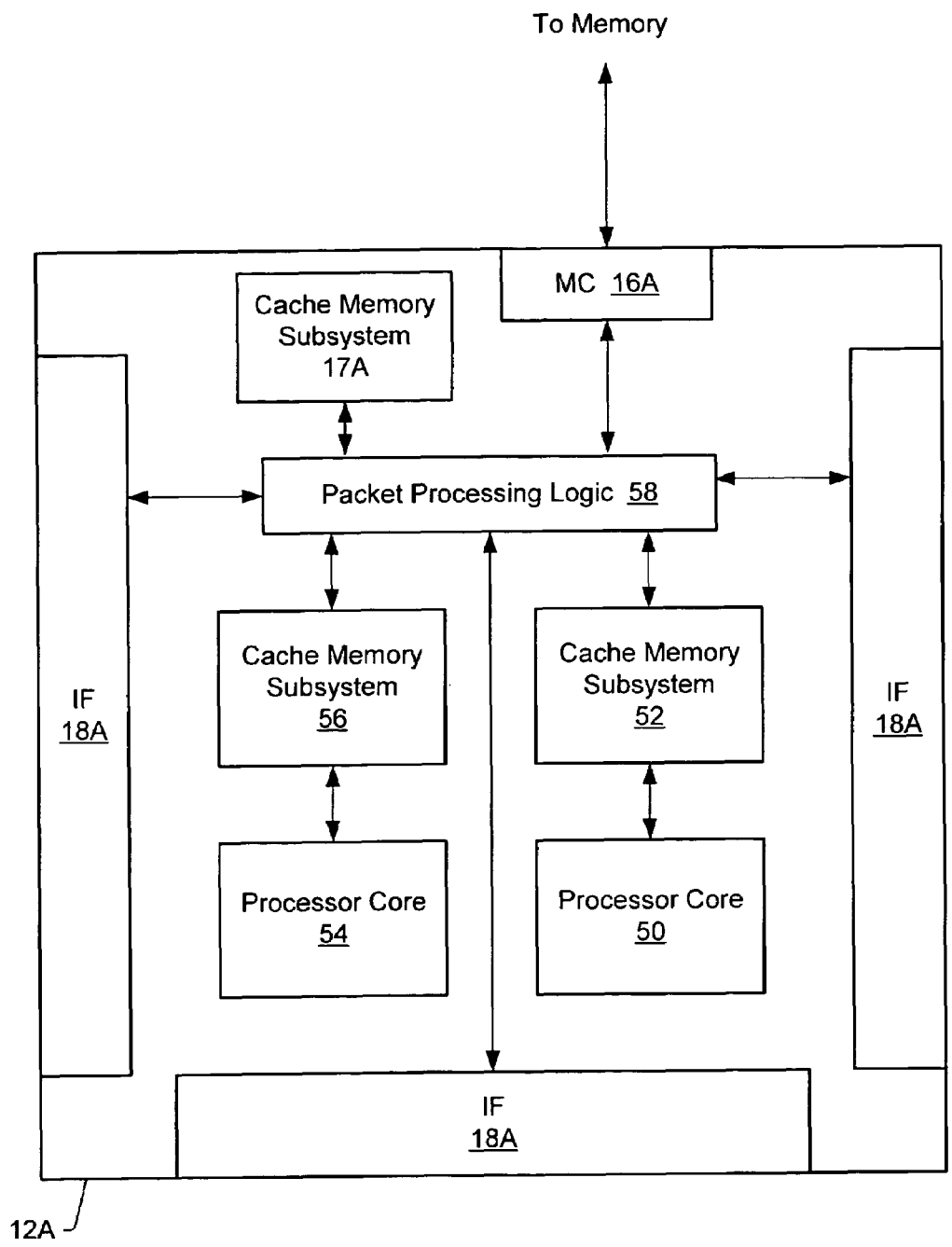
FIG. 1 is a block diagram of one embodiment of a processing node.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 is a block diagram of one embodiment of a processing node 12A. Processing node 12A includes memory controller 16A, interface logic 18A, a processor core 50, a cache memory subsystem 52 and packet processing logic 58, and cache memory subsystem 17A. Processing node 12A may also include one or more additional processor cores 54 and cache memory subsystems 56, as desired. In one embodiment, the illustrated functionality of processing node 12A is incorporated upon a single integrated circuit.

Generally speaking, packet processing logic 58 is configured to respond to control packets received on the links to which processing node 12A is coupled, to generate control packets in response to processor cores 50 and 54 and/or cache memory subsystems 52 and 56, to generate probe commands and response packets in response to transactions selected by memory controller 16A for service, and to route packets for which node 12A is an intermediate node to other nodes through interface logic 18A. Interface logic 18A may include logic to receive packets and synchronize the packets to an internal clock used by packet processing logic 58.

Cache subsystems 17A, 52 and 56 may generally comprise high speed cache memories configured to store blocks of data. Cache memory subsystems 52 and 56 may be integrated within respective processor cores 50 and 54. Alternatively, cache memory subsystems 52 and 56 may be coupled to processor cores 52 and 56 in a backside cache configuration or an in-line configuration, as desired. Still further, cache memory subsystems 52 and 56 may be implemented as a hierarchy of caches. Caches which are nearer processor cores 50 and 54 (within the hierarchy) may be integrated into processor cores 50 and 54, if desired. In one embodiment, cache memory subsystems 52 and 56 each represent level two (L2) cache structures and cache memory subsystem 17A represents a level three (L3) cache structure.

Processor cores 50 and 54 generally include circuitry for executing instructions according to a predefined instruction set. For example, the x86 instruction set architecture may be selected. Alternatively, the Alpha, PowerPC, or any other instruction set architecture may be selected. Generally, the processor core 50 and 54 access the cache memory subsystems 52 and 56, respectively, for data and instructions. If a cache miss is detected in a cache (52, 56) and a miss is also detected in the L3 cache 17A, a read request is generated and transmitted to the memory controller within the node to which the missing block is mapped. It is noted that the embodiment depicted in FIG. 1 is provided for purposes of discussion. Those skilled in the art will appreciate that the methods and mechanisms described herein are applicable to numerous alternative embodiments and configurations. For example, embodiments with more than two cores, or even a single core, are possible. All such alternatives are contemplated.

As noted above, in multi-programming environments, shared levels of cache may pose challenges. For example, multiple programs running on different cores (50, 54) may interact even though they are unrelated. Because they are unrelated, they may have different requirements for various resources, such as execution and memory resources. If one program is streaming through memory, it may needlessly displace data in the L3 cache 17A which is utilized by the other program. An example of streaming through memory may generally entail missing in the L3 cache 17A and allocating data therein, but not using the newly allocated data again. Consequently, this displacement may occur even though the program is gaining no (or relatively little) benefit from use of the L3 cache 17A.

In one embodiment, the cache management subsystem may be enhanced to determine when "exclusive" management versus "shared" management for a given cache line is preferred. Such an approach may serve to improve replacement decisions in cache 17A and hence overall system performance. In one embodiment, a baseline architecture for the system may comprise a "mostly exclusive with late-install policy" for the L3 cache 17A. This policy allocates a new L3 entry on L2 victims from core(s) (50, 54) and marks the newly allocated lines as most recently used (MRU). Other transactions to the L3 line generally make no change to the replacement information. Consequently, the cache line ages from MRU to least recently used (LRU) naturally with each subsequent victim which does not hit an existing L3 entry. Using such an approach, an existing L3 entry would never be migrated to the MRU state on further action. In the following discussion, various enhancements and policy decisions for both "shared" or "private" data are discussed. Generally speaking, "shared" may indicate that multiple cores (50, 54) have accessed a particular cache line and "private" may indicate that only a single core has accessed a particular cache line.

In view of the above baseline approach, a number of possible enhancements to management of the cache are contemplated. For example, the following provides a list of six possible enhancements which may be utilized separately, or in various combinations.

Scheme 1: Update replacement information in the cache 17A on each victim allocation or replacement transaction from any processor core. In this approach, the L3 cache 17A may behave more like a multi-core victim cache, where L3 replacement decisions are based on the "net victim history" of all cores.

Scheme 2: Update replacement information on fetches (e.g., reads, or read to share) when the L3 cache line was last accessed (fetch or victim) by a different core.

Scheme 3: Use preferred LRU management for shared lines, where a shared line gets additional priority (i.e., is not chosen for victim status as quickly) when making L3 replacement decisions. For example, in one embodiment a "shared" line gets one additional trip around the replacement list before actually being cast out. When a "shared" cache line is accessed, it is marked with a "preferred" indication which indicates to the replacement logic that it is being accessed by multiple entities and should not be replaced as quickly as other cache lines (i.e., those which are not "preferred"). When a preferred line becomes LRU, it is made MRU and marked as "unpreferred" to facilitate an additional trip through the replacement list.

Scheme 4: "Sticky" shared cache line detection. For policies which change LRU behavior (or updating) based on the shared/non-shared status of a cache line, make a shared cache line status sticky. This implies, if a cache line was ever marked shared, shared replacement policy management is applied on subsequent accesses to the line—even if the particular access in question is not shared (e.g. the access in question is from the same processing entity as the immediately preceding access, or is from the same processing entity that allocated the cache line into the cache).

Scheme 5: Private Data Policy for Modified data. If a line is in a modified (M) coherency state in the L3 cache 17A and a read transaction hits it, invalidate the line and return to the accessing core the data as modified (M). It is noted that this may be done conditioned on whether the M data is "private" or "shared" (i.e. the processing element that installed it into the L3 cache in M state is the same one that's subsequently accessing it with a read transaction).

Scheme 6: Private Data Policy for Shared/Exclusive data. If a line is in a shared or exclusive (S/E) coherency state in the L3 cache 17A and a read hits the line, invalidate the line if the access is a non-shared access (i.e. the line is being accessed by the same processing entity that installed the line into the L3 cache), and return to the accessing entity the data as S or E. In one embodiment, the Private Data Policy for Shared/Exclusive data may be selectively engaged based upon whether the request which hits the line is a "read" request (e.g. from the requesting processing entity's data cache) or a "read to share" request (e.g. from the requesting processing entity's instruction cache). Numerous such variants are contemplated.

Generally speaking, one or more of the above described schemes may require additional "touch bits" (discussed further below), scheme 4 may require an additional "sticky" bit, and scheme 3 may require one or more additional "preferred replacement" bits.

Figure 2:
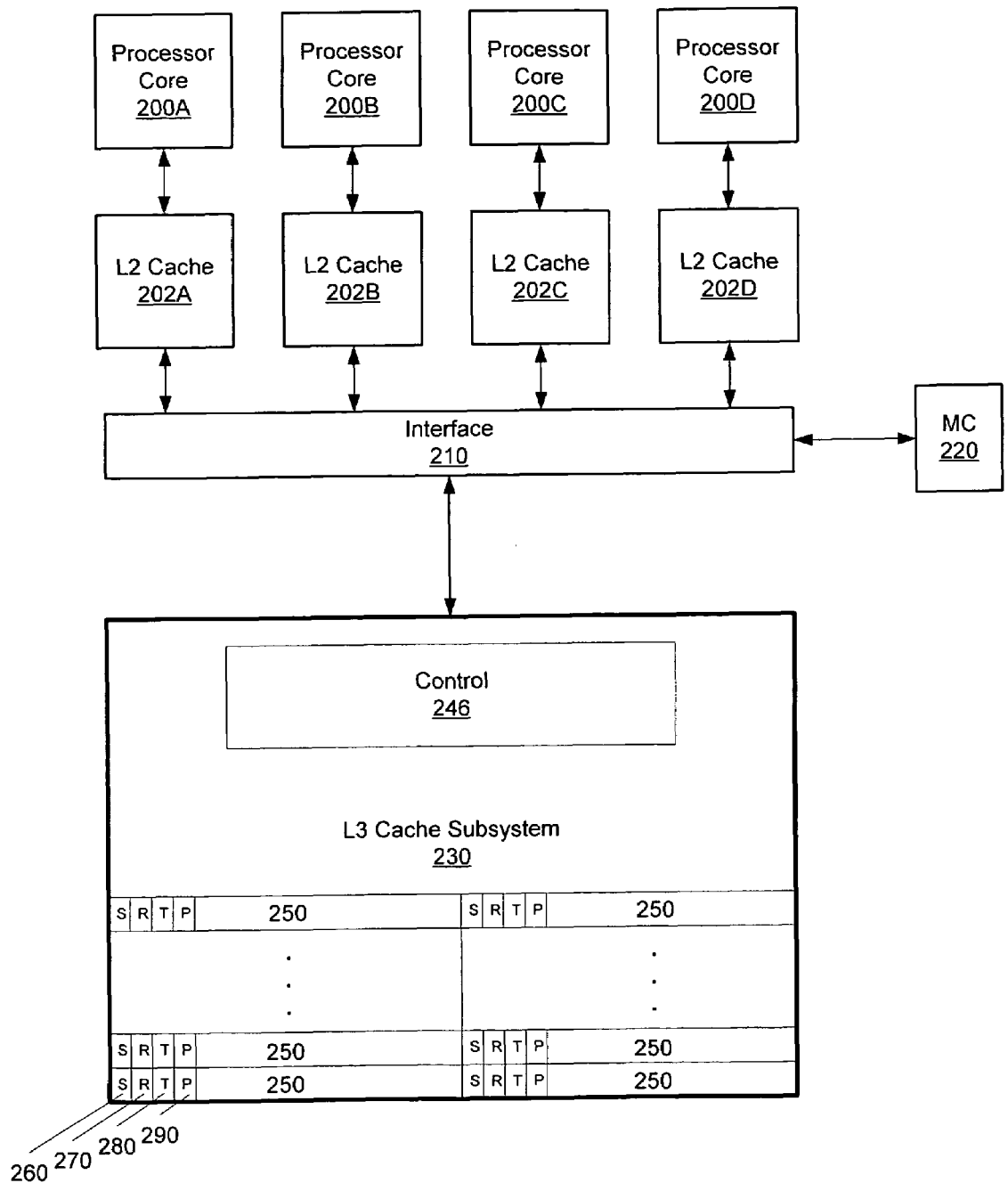
FIG. 2 is a block diagram of one embodiment of a processing system.

Turning now to FIG. 2, one embodiment of a system is shown which may be configured to manage a shared cache in accordance with one or more of the above described schemes. As shown, the system includes processor cores 200A-200D, each coupled to a respective L2 cache 202A-202D. L2 caches 202A-202D may generally by coupled for exclusive use by the respective processor core 200A-220D. Elements referred to herein with a particular reference number followed by a letter may be collectively referred to by the reference number alone. For example, processor cores 200A-200D may be collectively referred to as nodes processor cores 200. Also shown in FIG. 2 is an L3 cache subsystem 230 which is coupled to each of the cores 200 and caches 202 via an interface 210. Interface 210 is also coupled to a memory controller (MC) 220. L3 cache subsystem 230 may be shared by processor cores 200. In one embodiment, L3 cache 230 is a victim cache configured to store victims evicted from L2 caches 202. Accordingly, in such an embodiment the L3 cache 230 and L2 caches 202 do not store duplicate information. In alternative embodiments, duplicate information may be maintained. In one embodiment, the system depicted in FIG. 2 is manufactured as a single chip.

In one embodiment, L3 cache 230 may comprise a two-way set associate cache. However, other embodiments may utilize alternative cache structures. In the example shown, L3 cache 230 includes multiple entries 250 for storing data. In addition, L3 cache subsystem 230 includes a control circuit 246 for use in managing and supporting its operation. As is ordinarily the case, a replacement policy may be utilized for determining which of the data stored within the L3 cache 230 are replaced when necessary or otherwise desired. For example, L3 cache 230 may be configured to utilize a least recently used (LRU) replacement policy wherein least recently accessed data items are selected as candidates for replacement. As may be appreciated, such a replacement policy generally requires keeping track of when particular data items were accessed.

In one embodiment, "replacement" bits 270 may be maintained for each entry 250 to generally indicate when it was most recently accessed. The replacement bits could then be updated periodically and/or when a particular date item is accessed. For example, if a particular data entry 250 is accessed, the replacement bits for the entry could be updated to indicate it was most recently used (MRU). If a particular entry 250 is not accessed after a particular period of time, its corresponding replacement bits could be updated to indicate this fact (e.g., by downgrading its status from MRU to a lower status). It is noted that a status ranging from MRU to LRU may comprise any number of steps. In the simplest case, only the two conditions MRU and LRU are indicated and a single bit could be maintained. Alternatively, multiple bits may be maintained to indicate multiple statuses. For example, two bits could be used to indicate four statuses ranging from MRU ("11") to LRU ("00").

Typically, a replacement policy may operate by classifying a particular data item as MRU upon allocation in the cache. In such an embodiment, when allocating data in the L3 cache 230, the replacement bits 270 for the data being placed in the cache 230 are set to indicate the data has a status of MRU. It is noted that indications discussed herein, such as replacement bits 270, may be kept together or apart from a corresponding entry. In some cases it may be desired to distinguish between data 250 in the L3 cache 230 which is shared and non-shared. In one embodiment, each data item 250 stored in the cache 230 may also have associated shared (S) bit(s) 260, thread (T) bit(s) 280, and/or preferred (P) bit(s).

When a data item 250 is allocated in the cache 230, an identification of the thread or core 200 allocating the data may be included in the T bits 280. In addition, the shared (S) bit 260 may be set to indicate the data item 250 is shared. When an access is made to a data item 250 in the cache 230, the thread bit(s) 280 of the data item 250 are compared to the processing entity (e.g., core 200) making the access. If they are different, then a different core is accessing the data item and the S bit 260 of the data item may be changed to indicate it is shared. As will be discussed further below, a preferred (P) bit 290 may also be used to indicate a particular entry is to receive some type of preferred treatment. Depending upon the particular scheme(s) being used for cache management, one or more of bits 260, 270, 280, and/or 290 may be used. In the following discussion, various schemes and methods will be discussed which utilize one or more of the additional bits (260, 270, 280, 290).

Figure 3:
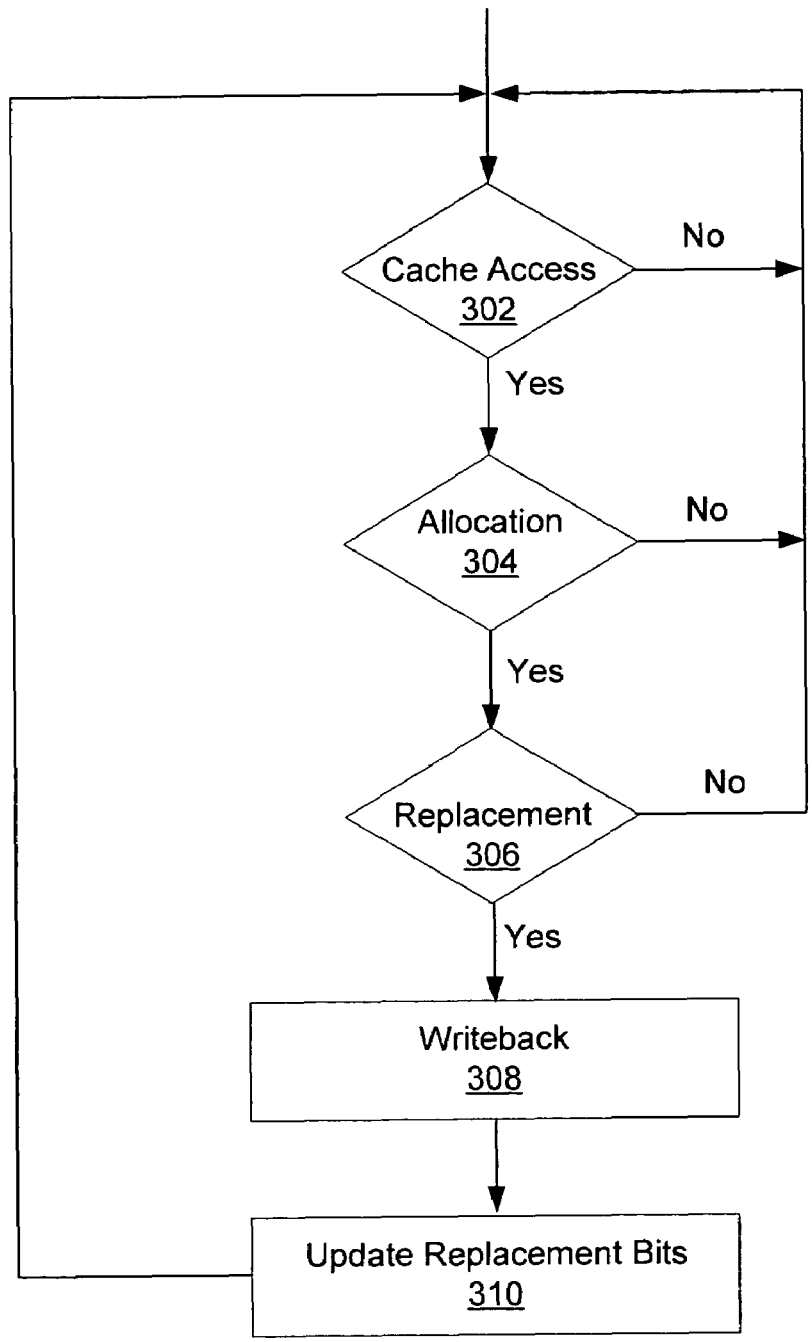
FIG. 3 depicts one embodiment of a method for managing a cache.

FIG. 3 depicts one embodiment of a method which generally corresponds to scheme 1 mentioned above. In scheme 1, replacement information in the cache 17A is updated on each victim/replacement transaction from any processor core. In this approach, the L3 cache 230 may behave more like a multi-core victim cache, where L3 replacement decisions are based on the "net victim history" of all cores. In the example of FIG. 3, a cache access may be detected (decision block 302) by control circuit 246. Responsive to such detection, a determination (decision block 304) is made as to whether the access corresponds to an allocation of a victim block into the shared cache. If an allocation is detected, and the allocation requires a replacement of existing data within the cache (decision block 306). The data being replaced may be written back (block 308) and replacement bits for each of the entries within the shared cache are updated (block 310). In this manner, the replacement information for each of the (occupied) entries is updated in response to a replacement event.

Figure 4:
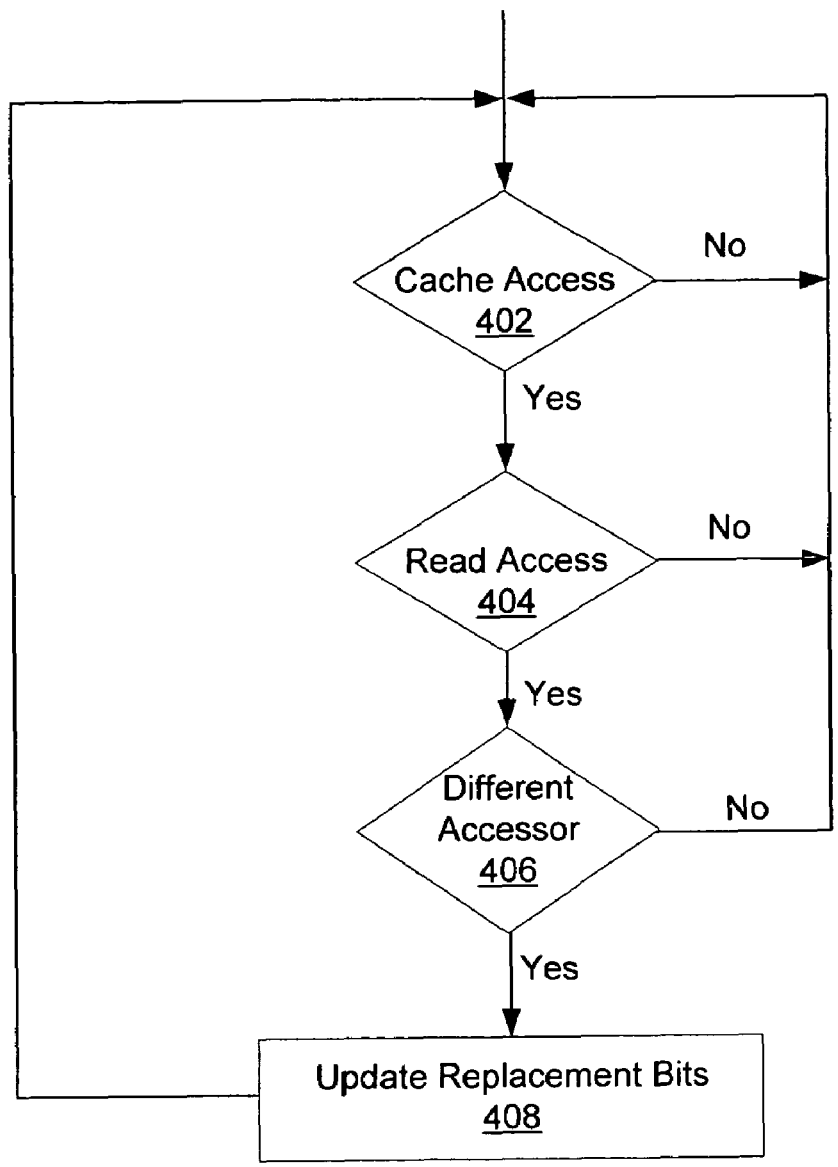
FIG. 4 depicts one embodiment of a method for managing a cache.

FIG. 4 depicts one embodiment of a method which generally corresponds to scheme 2 described above. In this approach, replacement information for occupied entries within the shared cache (e.g., L3 cache) is updated on fetches (e.g., reads, or read to share) when the data being accessed is being accessed by a different entity (e.g., a different core 200) from the last entity to access (fetch or victim) the particular data. As shown in the example, Responsive to a detected cache access (decision block 402), and determination is made as to whether the access is a read access (decision block 404). If the access is a read access, a comparison is made between the an identification of the accessing entity (e.g., a particular core 200) and an indication as to which entity last accessed the data currently being accessed. For example, a thread/core or other identifying bits (such as bits 280 depicted in FIG. 2) may be maintained and updated to reflect an accessing entity. If the comparison between the stored bits and the currently accessing entity indicate a different entity previously accessed the data (decision block 406), then the replacement bits for the currently occupied entries of the shared cache are updated (e.g., by aging the entries, or by updating the replacement bits according to some other algorithm). In addition, the thread/core bit(s) for the accessed entry may be updated to reflect an identification of the currently accessing entity. In this manner, an identification of the last entity to access a particular data item may be maintained.

Figure 5:
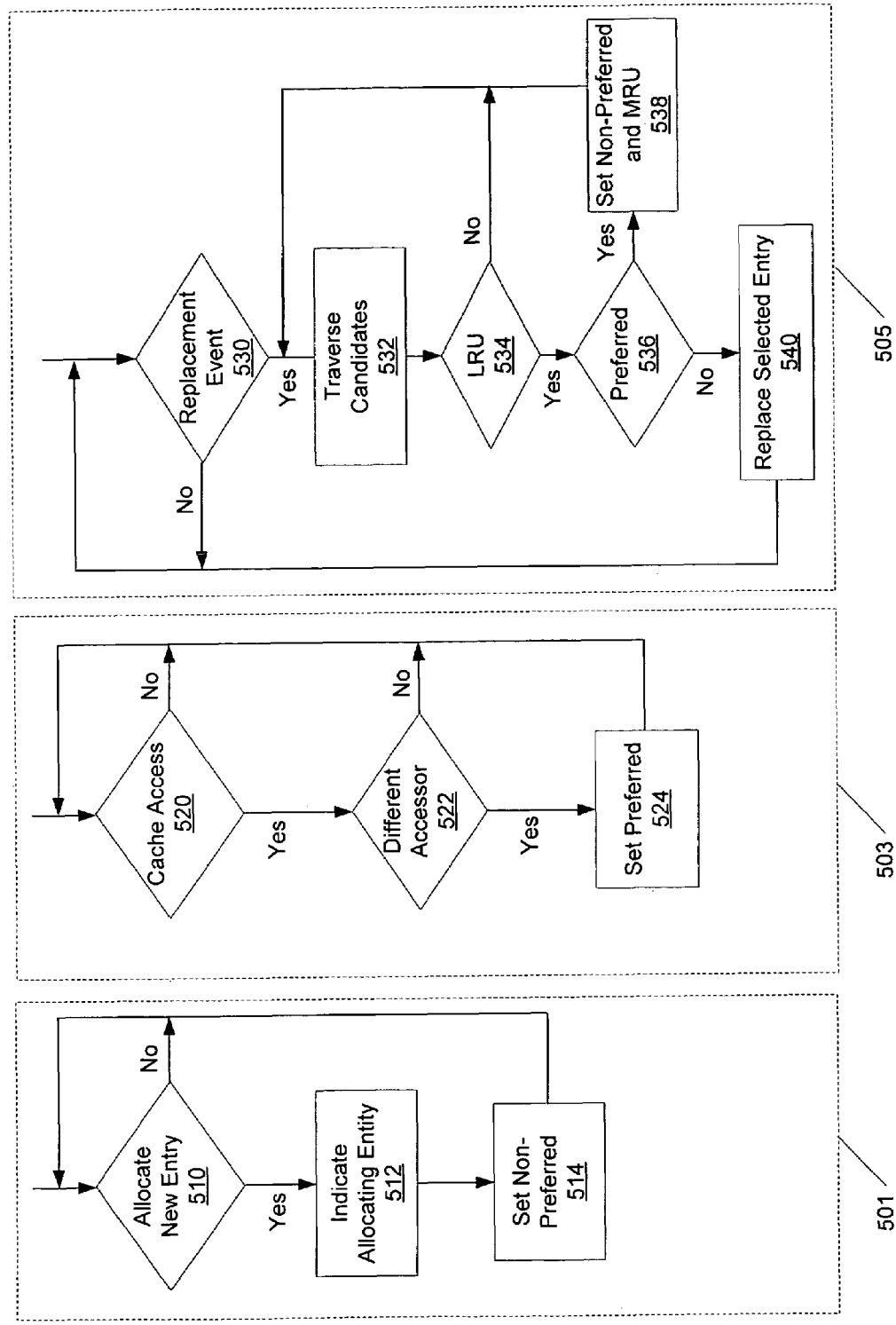
FIG. 5 depicts one embodiment of a method for managing a cache.

Turning now to FIG. 5, one embodiment of a method in accordance with scheme 3 described above is shown. As noted above, scheme 3 uses a replacement policy for the shared cache which gives preferential treatment to data which is shared by more than one entity (e.g., core). In this approach, data which is shared (e.g., a particular cache line) gets additional priority (i.e., is not chosen for victim status as quickly) when making shared cache replacement decisions. For example, in one embodiment a "shared" line gets one additional trip around the replacement list before actually being cast out. In other embodiments, the time a particular shared piece of data remains in a the shared cache may be lengthened in other ways. In one embodiment, when a cache line becomes a candidate for replacement (e.g., reaches LRU), if an indication exists that the line is "preferred", the line is marked unpreferred, and the replacement information is changed to MRU. The replacement policy is then traversed again. Only when a line is marked "unpreferred" is it allowed to be replaced.

FIG. 5 shows various aspects of processing that may occur in relation to scheme 3. Depicted in FIG. 5 are three blocks 501, 503, and 505 illustrating different types of processing which may occur. It is noted that various events depicted in FIG. 5 may occur concurrently, and/or in a different order than that depicted. The first block 501 shown generally corresponds to allocation of entries in accordance with scheme 3. In response to detecting the allocation of a new entry into the shared cache (decision block 510), an indication as to the allocating entity (e.g., an identification of the allocating core, process, or thread) may also be stored (block 512). In addition, an indication that the allocated data/entry is not preferred may also be stored. In one embodiment, non-preferred status may be conferred on data which is not deemed to be shared.

Block 503 in FIG. 5 may generally be seen to correspond to processes which occur in connection with a cache access (e.g., read accesses). In response to detecting a cache access to data (decision block 520), a determination may be as to whether the currently accessing entity is different than an entity which previously accessed the data. For example, bits which have been stored in association with the data may indicate a last entity to access the data. A comparison of the stored bits to the currently accessing entity may then reveal whether a "different" entity is accessing the data (decision block 522). If a different entity is accessing the data, then an indication may be stored that indicates the data is "preferred" (block 524). Such preferred status may be conferred on data which is determined to be shared by multiple entities.

Finally, block 505 generally corresponds to processing that may occur in relation to replacement decisions in the shared cache. In response to the detection of a replacement event (decision block 530), the replacement mechanism (e.g., control circuit 246 of FIG. 2) may traverse the candidates for replacement. For example, such traversing may generally include examining replacement bits which have been stored for entries of the shared cache. If a candidate meets particular criteria (decision block 534), such as LRU, then a determination may be made as to whether the candidate is "preferred" (decision block 536). Such preferred status may be conferred in a manner similar to that depicted by block 503 of FIG. 5. If the data is not indicated to be preferred, then the replacement mechanism may select that candidate for replacement (block 540). On the other hand, if the candidate is identified as being preferred (decision block 536), then the candidate may not be selected for replacement. Rather, the candidate may be re-classified as non-preferred (i.e., the candidate's preferred status is removed), and the candidate's replacement information upgraded such that the candidate data may remain in the cache longer (block 538). For example, the candidate's replacement bits may be set to MRU. In this manner, the data is moved to a later position in the replacement stack and may have a longer life in the shared cache.

Figure 6:
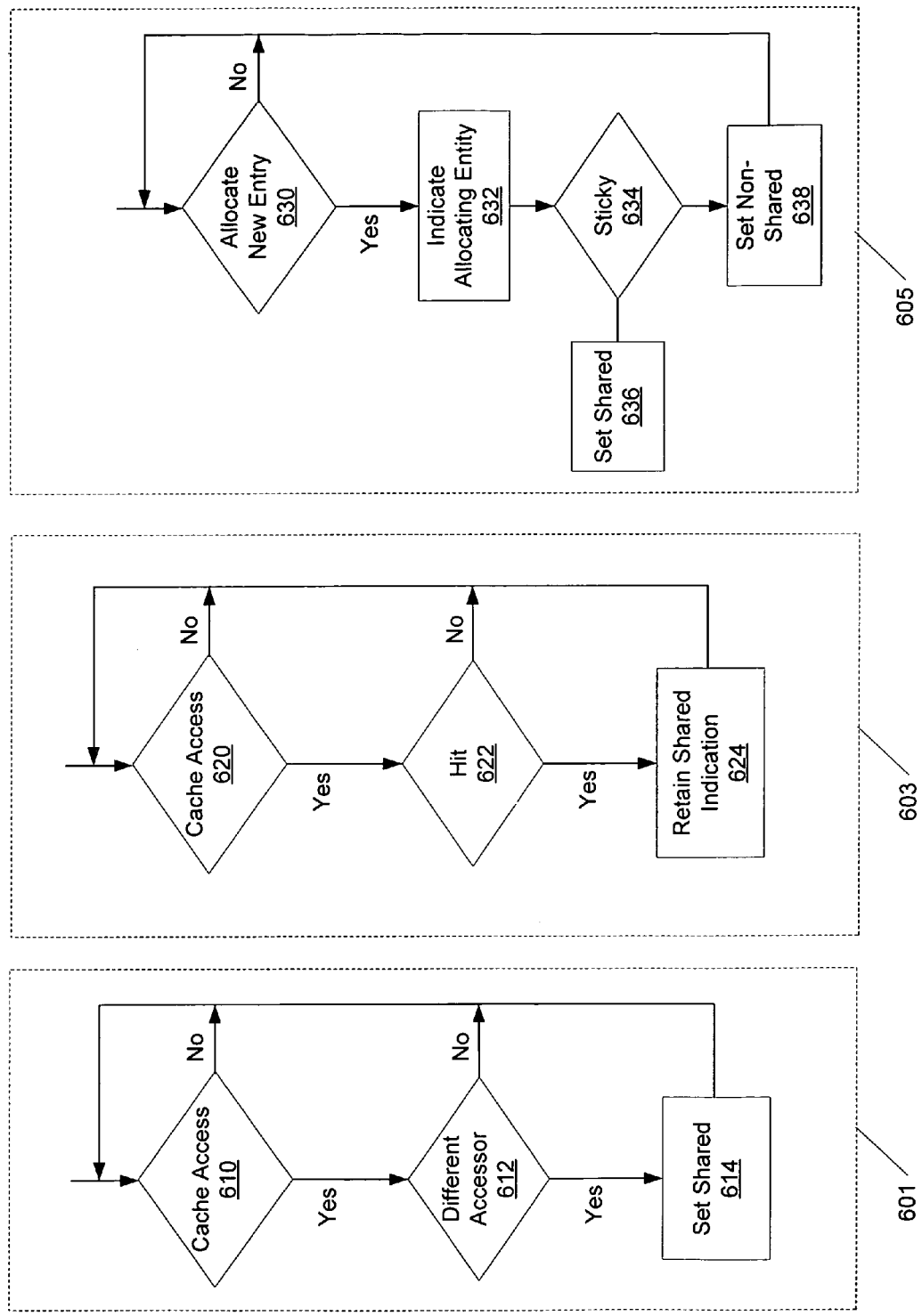
FIG. 6 depicts one embodiment of a method for managing a cache.

Turning now to FIG. 6, one embodiment of a method which generally corresponds to scheme 4 above is illustrated. In scheme 4, shared cache data indications may be "sticky". For example, if data within a shared cache is determined to be shared, information (e.g., a shared bit) may be stored which indicates this fact. Any suitable replacement policy applicable to shared data may then be applied. If that data is subsequently removed from the shared cache (e.g., from a victim L3 cache to an L2 cache), information regarding the shared nature of the data is retained. If that data is subsequently moved from the L2 cache back in to the L3 cache, the retained "shared" indication may be detected and the data may be immediately classified as shared within the L3 cache. In this manner, any cache management policies which are applicable to shared data may be applied to this data immediately. It is noted that in some embodiments, the sticky shared indication may also be retained for particular data even if the data is moved out to main memory or non-volatile storage (e.g., disk). In this manner, the sticky indication may follow data throughout the cache/memory subsystem.

In FIG. 6, three processing blocks which may generally correspond to the sticky shared scheme are illustrated. In the first block 601, responsive to a detected cache access (decision block 610), a determination may be made as to whether the current access is by a different accessor than a previous accessor of the data (decision block 612). For example, a thread/core bit may be maintained as discussed above. If a different entity is accessing the data, which may generally indicate the data is shared, an indication may be stored that the data is shared (block 614) and any desired policies applicable to shared data may be applied. In block 603, data may be removed from the shared cache (e.g., a shared victim cache) and moved to a different part of a cache/memory hierarchy. In this case, a detected cache access (decision block 620) is determined to hit within the shared cache (decision block 622). The data may then be removed from the cache as mentioned above. However, in this case, any shared indication which has been stored for the data may be retained (i.e., the shared indication is sticky). For example, the shared indication could follow the data and be stored with the data in its new location. Alternatively, the indication could be stored in a separate location.

Finally, block 605 depicts the allocation of data in the shared cache which was previously marked as shared. Upon allocation of data to the shared cache (decision block 630), some indication as to the allocating entity may be stored as well (block 632). Further, a determination may be made as to whether the data was previously indicated to be shared. For example, a sticky indication (such as a bit) may be checked for such an indication. If the sticky indication is set (decision block 634), then the data may be allocated in the shared cache and immediately marked as shared (block 636). Otherwise, the data may simply be stored and the shared indication not set (block 638). Utilizing such a "sticky" approach, the need for repeatedly learning that a particular data item is shared may be reduced or eliminated.

In one embodiment, a MOESI scheme may be utilized for maintaining cache coherency. Depending upon which of the above described scheme(s) are used, different coherency state transitions may be used. In the following two tables, different approaches may be used for the different schemes. It is to be understood that the embodiments depicted in the following tables are not intended to be limiting, but rather are intended for purposes of discussion. In TABLE 1, one embodiment of a coherency scheme which may be utilized in conjunction with schemes 1, 2, 5 and 6 is shown. In TABLE 2, one embodiment of a coherency scheme which may be utilized in conjunction with schemes 3 and 4 is shown. Generally speaking, schemes 3 and 4 include special policies for managing shared data—while schemes 1, 2, 5 and 6 do not necessarily include special policies for shared data. In the following, a ReadBlkS may refer to a request for a strictly shared copy, while a ReadBlk is a request for a non-shared copy which may be written at a future time.

TABLE 1

| Present Shared Cache State | Received Transaction | Return to Requestor | New Shared Cache State |
|---|---|---|---|
| M | ReadBlk | M copy | I |
| O | ReadBlk | S copy | O |
| E | ReadBlk | E copy | I |
| S | ReadBlk | S copy | I |
| M | ReadBlkS | S copy | O |
| O | ReadBlkS | S copy | O |
| E | ReadBlkS | S copy | S |
| S | ReadBlkS | S copy | S |

TABLE 2

| Present Shared Cache State | Received Transaction | Return to Requestor | New Shared Cache State |
|---|---|---|---|
| M | ReadBlk | M copy | O |
| O | ReadBlk | S copy | O |
| E | ReadBlk | E copy | I |
| S | ReadBlk | S copy | S |
| M | ReadBlkS | S copy | O |
| O | ReadBlkS | S copy | O |
| E | ReadBlkS | S copy | S |
| S | ReadBlkS | S copy | S |

Figure 7:
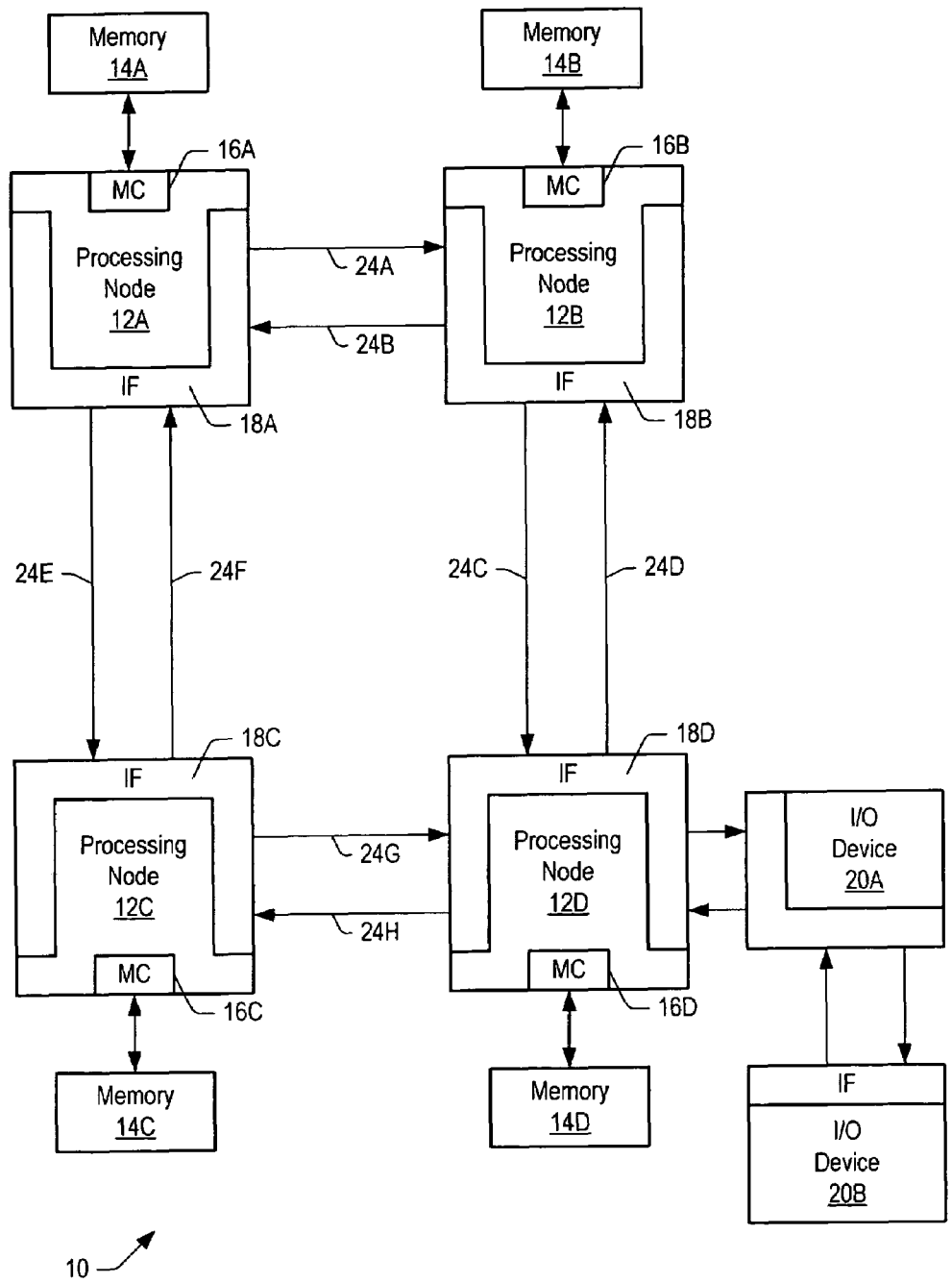
FIG. 7 is a block diagram of one embodiment of a computing system.

FIG. 7 depicts one embodiment of a computer system 10 which may incorporate the methods and mechanisms described above. Computer system 10 includes a plurality of processing nodes 12A, 12B, 12C, and 12D. Each processing node is coupled to a respective memory 14A-14D via a respective memory controller 16A-16D. Additionally, each processing node 12A-12D includes interface logic 18A-18D used to communicate with others of the processing nodes 12A-12D. For example, processing node 12A includes interface logic 18A for communicating with processing nodes 12B and 12C. Similarly, processing node 12B includes interface logic 18B for communicating with processing nodes 12A and 12D, and so on. In the embodiment of FIG. 7, processing node 12D is shown coupled to communicate with an input/output (I/O) device 20A via interface logic 18D, and I/O device 20A is further coupled to a second I/O device 20B. Other processing nodes may communicate with other I/O devices in a similar fashion. Alternatively, a processing node may communicate with an I/O bridge which is coupled to an I/O bus.

Computer system 10 may implement a packet-based link for inter-node communication. In the depicted embodiment, the link is implemented as sets of unidirectional lines (e.g. lines 24A are used to transmit packets from processing node 12A to processing node 12B and lines 24B are used to transmit packets from processing node 12B to processing node 12A). Other sets of lines 24C-24H are used to transmit packets between other processing nodes as illustrated in FIG. 7. The link may be operated in a cache coherent fashion for communication between processing nodes or in a non-coherent fashion as a daisy-chain structure between I/O devices 20A-20B (and additional I/O devices, as desired). It is noted that a packet to be transmitted from one processing node to another may pass through one or more intermediate nodes. For example, a packet transmitted by processing node 12A to processing node 12D may pass through either processing node 12B or processing node 12C as shown in FIG. 7. Any suitable routing algorithm may be used. Other embodiments of computer system 10 may include more or fewer processing nodes than the embodiment shown in FIG. 7. In addition, other embodiments are possible in which each processing node is coupled to every other processing node through a point-to-point network.

In addition to the depicted memory controller and interface logic, each processing node 12A-12D may include one or more processors and associated caches, as described further below. Broadly speaking, a processing node comprises at least one processor and may optionally include a memory controller for communicating with a memory and other logic, as desired. It is noted that the terms "processing node" and "processor node" may be used interchangeably herein.

Memories 14A-14D may comprise any suitable memory devices. For example, a memory 14A-14D may comprise one or more RAMBUS DRAMs (RDRAMs), synchronous DRAMs (SDRAMs), DRAM, static RAM, etc. The address space of computer system 10 is divided among memories 14A-14D. Each processing node 12A-12D may include a memory map used to determine which addresses are mapped to which memories 14A-14D, and hence to which processing node 12A-12D a memory request for a particular address should be routed. The particular processing node associated with a given memory address may be referred to herein as the home node of that address. In one embodiment, the coherency point for an address within computer system 10 is the memory controller 16A-16D coupled to the memory storing bytes corresponding to the address. Memory controllers 16A-16D may comprise control circuitry for interfacing to memories 14A-14D. Additionally, memory controllers 16A-16D may include request queues for queuing memory requests.

Generally, interface logic 18A-18D may comprise buffers for receiving packets from the link and for buffering packets to be transmitted upon the link. Computer system 10 may employ any suitable link level flow control mechanism for transmitting packets reliably. Communications between processing nodes 12A-12D of computer system 10 may be accommodated using various specific packet-based messaging, as desired.

I/O devices 20A-20B are illustrative of any desired peripheral devices. For example, I/O devices 20A-20B may comprise network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. A system comprising:
   a plurality of processing entities, wherein each of the plurality of processing entities comprises a processor core;
   a shared cache, the shared cache being shared by the plurality of processing entities, wherein the shared cache is a victim cache; and
   circuitry configured to manage a replacement policy of said shared cache, wherein the circuitry is configured to:

identify a data entry of the shared cache as a candidate for replacement;

modify a status of how recently the data entry has been used to indicate a more recently used status, responsive to detecting said data entry corresponds to data which is shared by two or more of the plurality of processing entities; and maintain an indication as to which processing entity of the plurality of processing entities caused an initial allocation of data into the shared cache, and wherein the circuitry detects a particular data item is shared by determining an access to a given data item stored in the shared cache corresponds to a processing entity other than a processing entity which caused an allocation of the given data item.

2. The system as recited in claim 1, wherein the circuitry is further configured to set a sticky indication that a data item within the shared cache is shared by two or more of the plurality of processing entities, wherein the sticky indication is maintained when the data item is removed from the shared cache.

3. The system as recited in claim 2, wherein upon allocation of a particular data item in the shared cache, the circuitry is further configured to store an indication that the particular data item is shared in response to detecting said sticky indication is set.

4. The system as recited in claim 1, wherein the circuitry is further configured to:

maintain replacement information for each entry of the shared cache;

update replacement information for entries of the shared cache to indicate the corresponding data is most recently used (MRU) upon allocation of corresponding data in the shared cache; and progressively age entries of the shared cache from an MRU status to a least recently used (LRU) status.

5. The system as recited in claim 4, wherein the circuitry is further configured to:

identify said data entry as a candidate for replacement, in response to detecting a status of said data entry is LRU; and modify a status of the data entry to indicate MRU, in response to detecting said data entry is shared by two or more of the plurality of processing entities.

6. A method for managing data in a memory system, the method comprising:

identifying a data entry of a shared cache as a candidate for replacement, the shared cache being shared by the plurality of processing entities, wherein each of the plurality of processing entities comprises a processor core with an exclusive cache and wherein the shared cache comprises a victim cache; and modifying a status of how recently the data entry has been used to indicate a more recently used status, responsive to detecting said data entry corresponds to data which is shared by two or more of the plurality of processing entities;

maintaining an indication as to which processing entity of the plurality of processing entities caused an initial allocation of data into the shared cache; and detecting a particular data item is shared by determining an access to a given data item stored in the shared cache corresponds to a processing entity other than a processing entity which caused an allocation of the given data item.

7. The method as recited in claim 6, further comprising:

setting a sticky indication that a data item within the shared cache is shared by two or more of the plurality of processing entities; and maintaining the sticky indication when the data item is removed from the shared cache.

8. The method as recited in claim 7, wherein upon allocation of a particular data item in the shared cache, the method further comprises storing an indication that the particular data item is shared in response to detecting said sticky indication is set.

9. The method as recited in claim 7, further comprising:

maintaining replacement information for each entry of the shared cache;

updating replacement information for entries of the shared cache to indicate the corresponding data is most recently used (MRU) upon allocation of corresponding data in the shared cache; and progressively aging entries of the shared cache from an MRU status to a least recently used (LRU) status.

10. The method as recited in claim 9, further comprising:

identifying said data entry as a candidate for replacement, in response to detecting a status of said data entry is LRU; and modifying a status of the data entry to indicate MRU, in response to detecting said data entry is shared by two or more of the plurality of processing entities.

11. A cache subsystem comprising:

a cache comprising a plurality of entries, wherein the cache is a victim cache; and circuitry configured to manage a replacement policy of the cache, wherein the circuitry is configured to:

identify a data entry of the cache as a candidate for replacement;

modify a status of how recently the data entry has been used to indicate a more recently used status, responsive to detecting said data entry corresponds to data which is shared by two or more of a plurality of processing entities, wherein each of the plurality of processing entities comprises a processor core;

maintain an indication as to which processing entity of the plurality of processing entities caused an initial allocation of data into the cache, and wherein the circuitry detects a particular data item is shared by determining an access to a given data item stored in the cache corresponds to a processing entity other than a processing entity which caused an allocation of the given data item.

12. The cache subsystem as recited in claim 11, wherein the circuitry is further configured to set a sticky indication that a data item within the cache is shared by two or more of the plurality of processing entities, wherein the sticky indication is maintained when the data item is removed from the cache.

13. The cache subsystem as recited in claim 12, wherein upon allocation of a particular data item in the cache, the circuitry is further configured to store an indication that the particular data item is shared in response to detecting said sticky indication is set.

* * * * *

UNITED STATES PATENT AND TRADEMARK OFFICE
CERTIFICATE OF CORRECTION

PATENT NO.         : 7,640,399 B1
APPLICATION NO. : 11/432707
DATED              : December 29, 2009
INVENTOR(S)        : Lepak et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 216 days.

Signed and Sealed this

Ninth Day of November, 2010

David J. Kappos
*Director of the United States Patent and Trademark Office*